(12) United States Patent
Jang et al.

(10) Patent No.: US 12,088,918 B2
(45) Date of Patent: Sep. 10, 2024

(54) CAMERA MODULE AND CONTROL METHOD OF CAMERA MODULE

(71) Applicant: LG INNOTEK CO., LTD., Seoul (KR)

(72) Inventors: Jung In Jang, Seoul (KR); Jae Wook Kwon, Seoul (KR); Dae Sik Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 281 days.

(21) Appl. No.: 17/596,575

(22) PCT Filed: Jun. 5, 2020

(86) PCT No.: PCT/KR2020/007363
§ 371 (c)(1),
(2) Date: Dec. 13, 2021

(87) PCT Pub. No.: WO2020/251223
PCT Pub. Date: Dec. 17, 2020

(65) Prior Publication Data
US 2022/0264018 A1    Aug. 18, 2022

(30) Foreign Application Priority Data
Jun. 13, 2019    (KR) .................. 10-2019-0069684

(51) Int. Cl.
*H04N 23/695* (2023.01)
*G01B 7/00* (2006.01)
(Continued)

(52) U.S. Cl.
CPC .......... *H04N 23/695* (2023.01); *G01B 7/003* (2013.01); *G03B 17/12* (2013.01); *H04N 23/54* (2023.01); *H04N 23/55* (2023.01)

(58) Field of Classification Search
CPC G01B 7/003; G03B 17/12; G03B 2205/0069; G03B 3/10; G03B 30/00;
(Continued)

(56) References Cited

U.S. PATENT DOCUMENTS 10,302,456 B1 *   5/2019   Choi ................... G01D 5/145
11,108,960 B2 *   8/2021   Li ....................... H04M 1/0264
(Continued)

FOREIGN PATENT DOCUMENTS

| KR | 10-2011-0040740 A | 4/2011 |
| KR | 10-2014-0135154 A | 11/2014 |
| KR | 10-2017-0063970 A | 6/2017 |

OTHER PUBLICATIONS

International Search Report dated Sep. 11, 2020 in International Application No. PCT/KR2020/007363.

*Primary Examiner* — Amy R Hsu
(74) *Attorney, Agent, or Firm* — Saliwanchik, Lloyd & Eisenschenk

(57) ABSTRACT

A camera module according to one embodiment may comprise: a lens barrel including at least one lens; a magnet disposed on one surface of the lens barrel; a first sensor and a second sensor which measure magnetic force emitted from the magnet; and a control unit which detects the position of the lens by removing noise due to an external environment on the basis of information on the magnetic force measured by the first sensor and the second sensor.

20 Claims, 9 Drawing Sheets

(51) Int. Cl.
  *G03B 17/12* (2021.01)
  *H04N 23/54* (2023.01)
  *H04N 23/55* (2023.01)

(58) Field of Classification Search
  CPC .......... G03B 5/00; H04N 23/54; H04N 23/55;
              H04N 23/687; H04N 23/695
  See application file for complete search history.

(56) References Cited

U.S. PATENT DOCUMENTS

| | | |
|---|---|---|
| 2013/0088607 A1 | 4/2013 | Akutsu et al. |
| 2014/0212118 A1* | 7/2014 | Shimoyama ......... H04N 23/687 |
| | | 396/55 |
| 2017/0223347 A1* | 8/2017 | Ezawa ................... H04N 23/50 |
| 2018/0051973 A1* | 2/2018 | Schrubbe ............... G01D 5/145 |
| 2019/0258141 A1* | 8/2019 | Park ....................... H04N 23/90 |
| 2019/0265068 A1* | 8/2019 | Ebina ..................... F16H 59/02 |

* cited by examiner

<Changes in the Graph due to External Disturbance>

100

CAMERA MODULE AND CONTROL METHOD OF CAMERA MODULE

CROSS-REFERENCE TO RELATED APPLICATIONS

This application is the U.S. national stage application of International Patent Application No. PCT/KR2020/007363, filed Jun. 5, 2020, which claims the benefit under 35 U.S.C. § 119 of Korean Application No. 10-2019-0069684, filed Jun. 13, 2019, the disclosures of each of which are incorporated herein by reference in their entirety.

TECHNICAL FIELD

The present invention relates to a camera module and a method for controlling a camera module, and more specifically, relates to a technology for detecting the position of a lens based on the information on the magnitude of the magnetic force emitted from the magnet that has been acquired by measuring using a plurality of Hall sensors, from which noise caused by external factors had been removed by using trigonometric functions in advance.

BACKGROUND ART

As technology advances and miniaturization of camera modules becomes possible, small camera modules are being applied to and used in various IT devices such as smartphones, mobile phones, PDAs, and the like. The camera module is manufactured using an image sensor such as CCD or CMOS as a main component, and is manufactured to enable focus adjustment in order to adjust the size of an image.

Such a camera module is configured to include a plurality of lenses and an actuator, and an object with respect to the subject can be photographed in a manner in which an optical focal length is adjusted when the actuator moves each lens to change the relative distance.

Specifically, the camera module includes an image sensor that converts an optical signal received from the outside into an electrical signal, a lens that focuses light onto the image sensor, an infrared (IR) filter, a housing including them, and a printed circuit board that processes the image sensor signal, and the like, and the actuator adjusts the focal length of the lens by an actuator such as a voice coil motor (VCM) actuator or a micro electromechanical systems (MEMS) actuator.

Meanwhile, portable devices such as smartphones, tablet PCs, and laptops have built-in ultra-small camera modules, and such camera modules may perform an autofocus (AF) function that automatically adjusts the distance between the image sensor and the lens to align the focal lengths of the lenses.

In addition, generally, cameras are equipped with a zoom function to take pictures of distant objects, and the zoom function is largely divided into an optical zoom in which the actual lens inside the camera moves to increase or decrease the magnification on the subject, and a digital zoom method in which zoom effect is achieved by enlarging a portion of an image data of the photographed subject using a digital processing method.

In the case of optical zoom for obtaining an image of an object by using a lens movement, there is an advantage of obtaining an image having a relatively high resolution compared to a digital processing method.

In addition, in recent camera modules, image stabilization (IS) technology is employed to correct or inhibit image shake due to camera movement caused by unstable fixing devices or user movement.

Typically, an optical image stabilizer (OIS) technology is used to compensate for movement by changing a light path by physically moving a lens or an image sensor of a camera. Therefore, the OIS technology detects the movement of the camera through a gyro sensor or a Hall sensor, and based on this, correction is performed in a way that the distance that the lens or image sensor should move is calculated.

And the OIS correction method is largely divided into a lens movement method and a module tilting method. In the lens movement method, correction is performed by moving only the lens in the camera module to realign the center and optical axis of the image sensor. On the other hand, in the module tilting method, correction is performed by moving the entire module including the lens and the image sensor.

Therefore, when the correction is performed by the lens movement method, a Hall sensor is provided inside the camera module to detect the position and movement of the lens. Specifically, after detecting the magnitude and direction of the magnetic force emitted from the sensing magnet disposed on the outer circumferential surface of the lens module or the lens assembly, and based on this, the position of the lens can be detected.

However, in the case of this method, the magnitude of the magnetic force emitted from the sensing magnet is greatly influenced by external factors. For example, since it is greatly affected by temperature, external impact, signal interference, external disturbance, and the like, the magnitude of the magnetic force measured by the Hall sensor measures the result including noise caused by such external influence, and therefore, in the case of detecting the position of the lens based on such results, there is a disadvantage in that the position of the lens cannot be accurately detected.

That is, in the camera module, one sensor for measuring the magnetic force is disposed for each sensing magnet, and the magnitude and direction of the magnetic force measured by the sensor measure the result affected by the external influence, so there was a problem that there is a mismatch between the actual lens position and the detected lens position.

DETAILED DESCRIPTION OF THE INVENTION

Technical Subject

Accordingly, the present invention is an invention devised to solve the problems of the prior art as aforementioned, and an object of the present invention is to provide a camera module and a method for controlling a camera module capable of more accurately detecting a position of a lens by acquiring information about a magnetic force from which external influence is removed using a plurality of sensors.

More specifically, this is to provide a camera module and a method for controlling the camera module capable of more accurately detecting the lens position by generating trigonometric functions based on the measured results using a plurality of sensors, and obtaining the result from which the noise including external influences is removed by using the generated trigonometric functions.

Technical Solution

A camera module according to one embodiment may comprise: a lens barrel including at least one lens; a magnet disposed on one surface of the lens barrel; a first sensor and a second sensor which measure magnetic force emitted from the magnet; and a control unit which detects the position of the lens by removing noise due to an external environment on the basis of information on the magnetic force measured by the first sensor and the second sensor.

The control unit may detect the position of the lens based on the value of a numerical value including information on the magnetic force measured by the first sensor being offset with a numerical value including information on the magnetic force measured by the second sensor.

The control unit respectively generates trigonometric functions that contain information on the magnitude of magnetic force according to position based on the information about the magnetic force measured by the first sensor and the second sensor, and may detect the position of the lens based on the generated multiple trigonometric functions.

The controller may generate a sine (sin) function expression or a cosine (cos) function expression as a method of approximation of a numerical value including information on the magnetic force measured by the sensor.

The control unit may generate a tangent (tan) function expression or an arctangent (arctan) function expression using the sine (sin) function expression and the cosine (cos) function expression, and then detect the position of the lens based on the generated function expression.

In the camera module, the control unit generates a sine (sin) function expression including the magnitude of the magnetic force according to the position based on the information measured by the first sensor, and generates a cosine (cos) function expression including the magnitude of a magnetic force according to a position based on the information measured by the second sensor.

The first sensor and the second sensor may be disposed on the same axis line.

The first sensor and the second sensor may be disposed at positions symmetrical to each other with respect to a center line of the magnet.

The first sensor and the second sensor may be disposed equally spaced apart from each other by a preset first distance with respect to the magnet.

The preset first distance may include a distance of 0.5 mm or more and 2 mm or less.

The first sensor and the second sensor may be disposed to be spaced apart by a preset second distance.

The preset second distance may include a distance of 1 mm or more and 2 mm or less.

A camera module according to another embodiment may comprise: a first lens and a second lens; a first barrel and a second barrel respectively coupled to one surface of the first lens and the second lens; a first magnet and a second magnet respectively coupled to one surface of the first barrel and second barrel; and a control unit for respectively generating trigonometric functions that contain information on the magnitude of magnetic force according to position based on the information measured by the plurality of sensors and a plurality of Hall sensors each measuring a plurality of magnetic forces emitted from the first magnet and the second magnet, and detecting the positions of the first lens and second lens based on the generated multiple trigonometric functions.

The plurality of Hall sensors may include a first sensor and a second sensor for measuring the magnetic force emitted from the first magnet, and a third sensor and a fourth sensor for measuring the magnetic force emitted from the second magnet.

The control unit generates a sine (sin) function expression or a cosine (cos) function expression including information on the magnitude of a magnetic force according to a position based on the information measured by the sensor, and then generates a tangent (tan) function expression or an arctangent (arctan) function expression using the sine function expression and the cosine function expression, and then may detect the position of the lens using the generated function expressions.

A control method of a camera module according to another embodiment, in a control method of a camera module for detecting the position of at least one lens, may comprise the steps of: measuring the magnitude of the magnetic force emitted from a magnet disposed on one surface of the lens using a first sensor and a second sensor; and detecting the position of the lens by removing noise caused by an external environment based on information on magnetic force measured by the first sensor and the second sensor.

The step of detecting the position of the lens may include a step of detecting the position of the lens based on the value of a numerical value that include information on the magnetic force measured by the first sensor being offset with a numerical value including information on the magnetic force measured by the second sensor.

The step of detecting the position of the lens may include a step of respectively generating trigonometric functions that include information on the magnitude of magnetic force according to position based on the information measured by the first sensor and the second sensor, and detecting the positions of the first lens and second lens based on the generated multiple trigonometric functions.

The step of generating the trigonometric functions may include generating a sine (sin) function expression or a cosine (cos) function expression that contain information on the magnitude of a magnetic force according to a position based on the information measured by the sensor.

The step of detecting the position of the lens may include a step of generating a tangent (tan) function expression or an arctangent (arctan) function expression using the sine (sin) function expression and the cosine (cos) function expression, and then detecting the position of the lens using the generated function expressions.

The first sensor and the second sensor may be disposed equally spaced apart from each other by a preset first distance with respect to the magnet.

The first sensor and the second sensor are disposed on the same axis line or may be disposed at positions symmetrical to each other with respect to the center line of the magnet.

Advantageous Effects

In the camera module according to an embodiment, in detecting the position of the lens inside the camera module, the influence due to the external environment can be removed, so that the position of the lens can be more accurately detected. Therefore, there is an effect in that OIS correction can be performed accurately.

In addition, the camera module according to an embodiment can detect the position of the lens by additionally attaching only a sensor without additionally attaching an expensive device, so there is an effect in that a camera module that can accurately detect the position of the lens can be produced more economically.

BEST MODE

Figure 1:
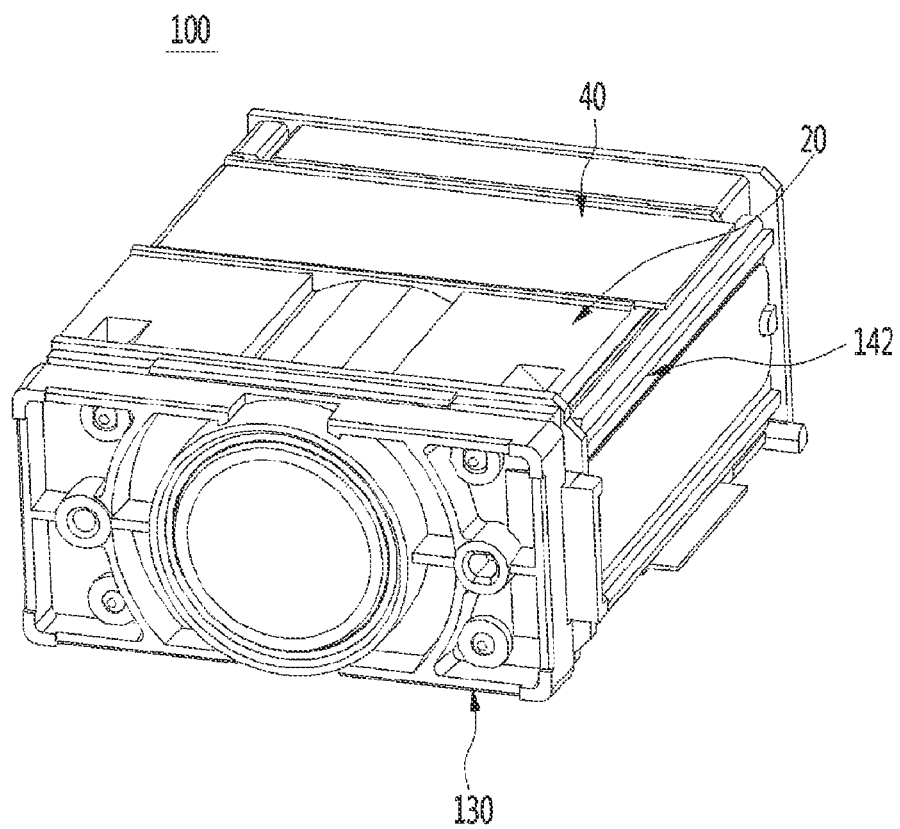
FIG. 1 is a diagram illustrating a perspective view of a camera module according to an embodiment.

The embodiments described in the present specification and the configurations shown in the drawings are preferred examples of the disclosed invention, and there may be various modifications that may replace the embodiments and drawings of the present specification at the time of filing of the present application.

In addition, terms used in the present specification are used to describe embodiments and are not intended to limit and/or limit the disclosed invention. Singular expressions include plural expressions unless the context clearly indicates otherwise.

In the present specification, terms such as "comprise", "include" or "have" are intended to designate the presence of features, numbers, steps, actions, components, parts, or a combination thereof described in the specification. Or the presence or addition of other features, numbers, steps, actions, components, parts, or combinations thereof, or any other feature, or a number, steps, operations, components, parts, or combinations thereof, and includes ordinal numbers such as "first" and "second" used herein. The terms described above may be used to describe various components, but the components are not limited by the terms.

Hereinafter, embodiments of the present invention will be described in detail with reference to the accompanying drawings so that those of ordinary skill in the art may easily implement the present invention. In addition, in the drawings, parts not related to the description are omitted in order to clearly describe the present invention.

The camera module 100 described in the drawings below may be a "camera device", and the camera module 100 may include a "lens driving device". The camera module 100 may include an "AF actuator 600" and an "OIS actuator".

The camera module 100 may include a printed circuit board (PCB), a lens driving device may be disposed on the printed circuit board, and the printed circuit board may be electrically connected to an image sensor.

In addition, the camera module 100 may include an image sensor.

The image sensor may be disposed below the lens. The image sensor may be disposed on a printed circuit board. The image sensor may be coupled to a printed circuit board by surface mounting technology (SMT). The image sensor may convert light irradiated to the effective image area of the image sensor into an electrical signal. The image sensor may include any one among a charge coupled device (CCD), a metal oxide semi-conductor (MOS), a CPD, and a CID.

The camera module 100 may include a lens module. The lens module may include a lens and a barrel. For example, a plurality of lenses may be stacked and coupled to the inner circumferential surface of the barrel, and the barrel to which the lenses are coupled may be coupled to the inner circumferential surface of the holder and then mounted on the housing 300. The lens may include a plurality of lenses.

Figure 2:
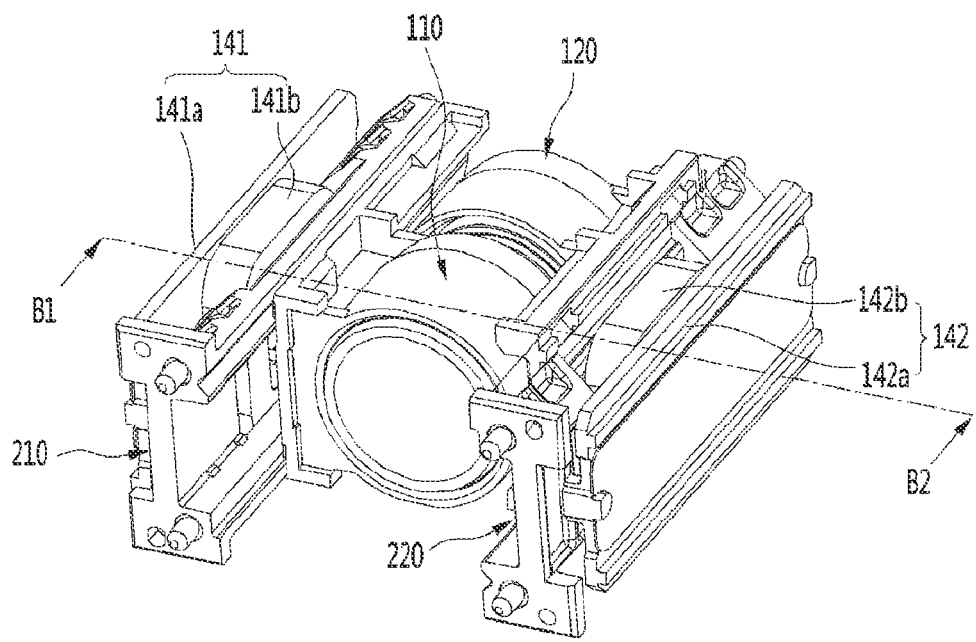
FIG. 2 is an exploded perspective view of a camera module in which some components are omitted according to an embodiment.
Figure 3:
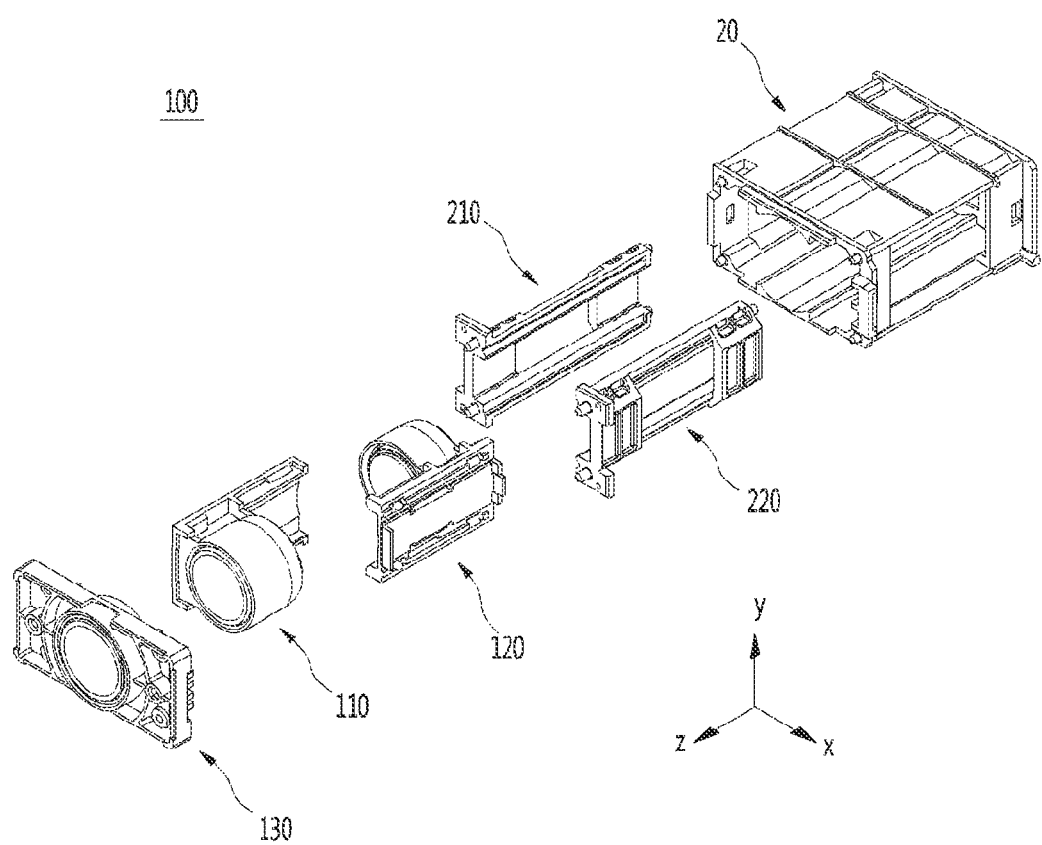
FIG. 3 is an exploded perspective view of a camera module in which some components are omitted according to an embodiment.

FIG. 1 is a diagram illustrating a perspective view of a camera module 100 according to an embodiment, and FIGS. 2 and 3 are exploded perspective views of a camera module 100 in which some components are omitted according to an embodiment.

Referring to FIGS. 1 and 2, the camera module 100 according to an embodiment may comprise a base 20, a circuit board 40 disposed at an outer side of the base 20, a fourth driving unit 142, and a third lens assembly 130.

In addition, the camera module 100 according to an embodiment may comprise a first guide unit 210, a second guide unit 220, a first lens assembly 110, a second lens assembly 120, and a third driving unit 141, a fourth driving unit 142, wherein the third driving unit 141 and the fourth driving unit 142 may include a coil or a magnet.

Although not illustrated in the drawing, the lens assembly may include a lens module and a holder.

The lens module may include a lens and a barrel, and for example, a plurality of lenses may be stacked and coupled to the inner circumferential surface of the barrel, and the barrel to which the lens is coupled may be coupled to the inner circumferential surface of the holder. The holder may be a 'bobbin', and the holder may be disposed in a movable structure inside the housing 100.

Referring to FIG. 2, when the third driving unit 141 and the fourth driving unit 142 include coils, the third driving unit 141 includes a first coil unit 141b and a first yoke 141a, and the fourth driving unit 142 may include a second coil unit 142b and a second yoke 142a. Or conversely, the third driving unit 141 and the fourth driving unit 142 may include magnets.

In the x, y, and z axis direction illustrated in FIG. 3, the z axis means an optical axis direction or a direction parallel to this, the x-z plane represents the ground, the x axis means a direction perpendicular to the z axis on the ground (x-z plane), and the y axis may mean a direction perpendicular to the ground.

Referring to FIG. 3, the camera module 100 according to an embodiment may comprise a base 20, a first guide unit 210, a second guide unit 220, a first lens assembly 110, a second lens assembly 120, and a third lens assembly 130.

As described in FIG. 1, each of the first lens assembly 110, the second lens assembly 120, and the third lens assembly 130 may include a lens and a barrel, and the barrel to which the lens is coupled may be coupled to the inner circumferential surface of each holder.

The camera module 100 according to an embodiment may comprise a base 20, a first guide unit 210 disposed on one side of the base 20, a second guide unit 220 disposed on the other side of the base 20, a first lens assembly 110 corresponding to the first guide unit 210, and a second lens assembly 120 corresponding to the second guide unit 220.

In FIG. 3, although it is illustrated in that the third lens assembly 130 disposed in front of the first lens assembly 110 in the optical axis direction may be included, but the camera module 100 according to an embodiment may include only the first lens assembly 110 and the second lens assembly 120 as components except the third lens assembly 130.

Figure 4:
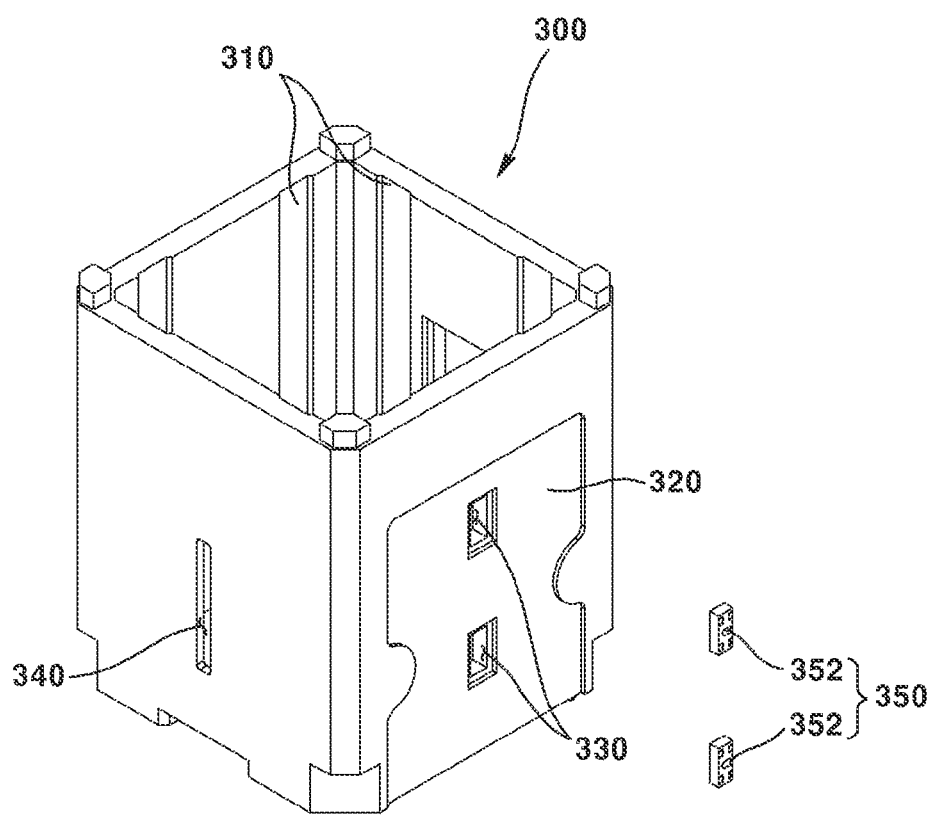
FIG. 4 is an exploded perspective view illustrating a partial configuration of a camera module according to another embodiment.

FIG. 4 is an exploded perspective view illustrating a partial configuration of the camera module 100 according to another embodiment.

Referring to FIG. 4, the camera module 100 may include a housing 300. The housing 300 may be disposed inside the cover (not shown) and outside the holder (not shown), and the holder to which the lens is coupled may be disposed spaced apart inside the housing 300. Accordingly, the holder may be moved up and down according to the operation of the control unit 600 inside the housing 300.

The housing 300 may include a groove 310. The groove 310 may be formed being extended in the optical axis direction on the inner side surface of the housing 300. A support member (not shown) may be disposed in the groove 310, so that the disposed support member may move up or down along the groove 310.

The housing 300 may include a substrate accommodating groove 320. The substrate accommodating groove 320 may accommodate a circuit board (not shown). The substrate accommodating groove 320 may be formed in a shape corresponding to that of the circuit board, through which the circuit board may be inserted and fixed in the substrate accommodating groove 320.

The housing 300 may include a sensor hole 330, and a sensor 350 may be disposed in the sensor hole 330. Specifically, the sensor hole 330 may be disposed with one or a plurality of Hall sensors capable of detecting the magnitude and direction of magnetic force emitted from the lens assemblies 110, 120, 130 or the magnet 400 attached to the lens barrel.

In FIG. 4, as an example, although it is illustrated that there are two sensor holes 330, the number of sensor holes 330 is not limited thereto, and may be disposed in various numbers such as one, three, four, and the like in various numbers. Therefore, it is obvious that the Hall sensors 350 are respectively disposed as many as the number of the disposed sensor holes 330.

Specifically, the sensor hole 330 may be formed to penetrate the housing 300 in a direction perpendicular to the optical axis. Through this structure, the sensor 350 disposed on the outer surface of the housing 300 may sense the magnitude and direction of the magnetic force emitted from the magnet 400 disposed in the housing 300.

In addition, the distance between the sensor 350 and the magnet 400 may be installed to be disposed at various distances depending on the purpose of manufacture.

For example, when the distance between the sensor that detects the magnitude and size of magnetic force and the magnet is disposed too far away, it is difficult to accurately detect the magnitude and direction of the magnetic force emitted from the magnet, and conversely, when they are disposed too close, the direction and magnitude of the changing electromagnetic force cannot be accurately measured, and thus the position of the lens cannot be accurately measured. Accordingly, the distance between the magnet and the sensor may be disposed at a position capable of accurately measuring the position of the lens. A detailed description on this will be described later with reference to FIGS. 8A and 8B.

In addition, in FIG. 4, although the method of detecting the position of one lens has been described as a reference, as described in FIG. 3, in the case of a high-resolution zoom camera module, a plurality of types of lenses may be mounted on the camera.

Therefore, when the number of lenses mounted in the camera module 100 is provided as two or more, and the position of each lens needs to be measured, one or two sensors per one lens may be disposed adjacently. Of course, the number of sensors per one lens is not limited to one or two and more sensors may be disposed according to the purpose of manufacture and use environment of the camera module.

Figure 5:
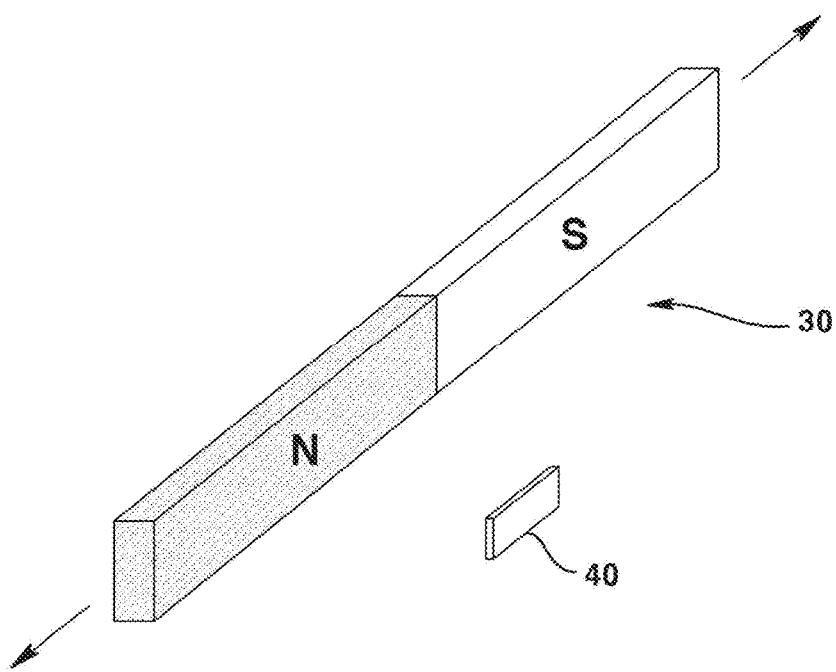
FIG. 5 is a drawing illustrating a magnet and a sensor for detecting the magnitude and direction of a magnetic force emitted from the magnet.
Figure 6A:
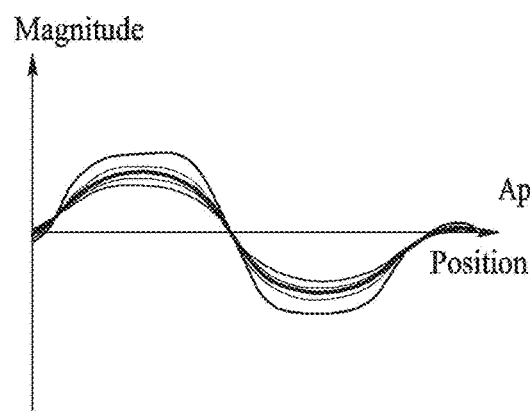
FIGS. 6A and 6B are drawings showing the magnitude and direction of the magnetic force emitted from the magnet that is detected through the sensor according to the position as a graph.
Figure 6B:
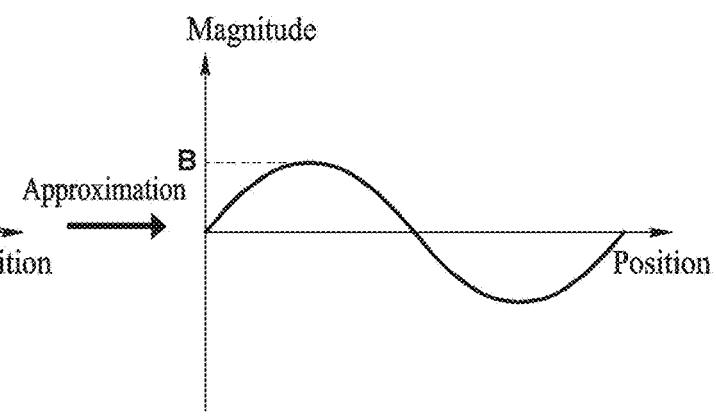
Figure 7:
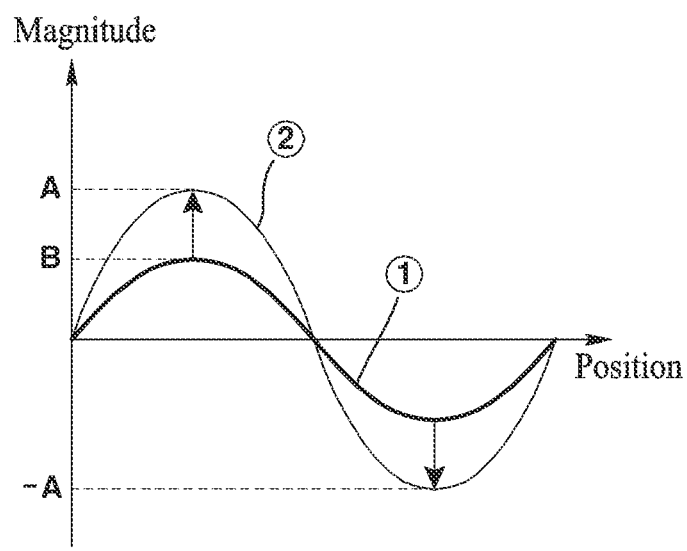
FIG. 7 is a drawing illustrating a state in which the magnitude of the magnetic force emitted from the magnet is changed due to an external influence.

FIG. 5 is a diagram illustrating an arrangement of a magnet and a sensor for detecting the magnitude of a magnetic force emitted from the magnet, according to an embodiment, and FIGS. 6A and 6B are diagrams illustrating the magnitude and direction of the magnetic force emitted from the magnet detected by the sensor. FIG. 7 is a diagram illustrating a change in the magnitude of a magnetic force sensed by a sensor due to an external influence.

Specifically, FIG. 5 is a diagram illustrating only the magnet and the sensor separated from various components of the camera module in order to explain only the relationship between the magnet 30 and the sensor 40.

Referring to FIG. 5, since the magnet 30 is attached to the lens barrel or the lens assembly, the magnet 30 may move according to the movement of the lens barrel or the lens assembly. However, the sensor 40 is generally attached to a fixed position and therefore does not move.

Accordingly, the size at which the sensor 40 detects the magnitude of the magnetic field emitted from the magnet 30 has a characteristic that changes depending on the position as illustrated FIG. 6A.

However, the graph FIG. 6A illustrates a state in which several graphs are merged, which illustrates results measured differently depending on the location where the sensor 40 is disposed.

That is, since the magnitude of the magnetic field detected by the sensor 40 is measured differently depending on the location where the sensor is disposed, as illustrated in FIG. 6A, the magnitude of the magnetic field detected according to the position where the sensor is disposed may appear in various shapes.

For example, if the magnitude of the magnetic force emitted from the magnet is the same, the magnitude of the detected magnetic field will be strong in the case of a sensor disposed at the position closest to the magnet, and in the case of a sensor disposed farthest from the magnet, the magnitude of the detected magnetic field will be weak.

Accordingly, the graph at the bottom of the several graphs illustrated in FIG. 6A is a graph illustrating the measured result when the sensor is disposed at the farthest position from the magnet, and the uppermost graph among several graphs illustrated in FIG. 6A is a graph illustrating the measurement result when the sensor is disposed at the closest position to the magnet.

And FIG. 6B is a graph separately illustrating a graph most similar to the trigonometric function among several graphs according to the results measured according to the position of the sensor, and is a graph illustrating the results measured by the sensor in which the measured magnetic field magnitude is measured to be a waveform most similar to a sine function (sin) or a cosine function (cos).

In general, since the magnet moves only up and down based on one axis, the size and direction of the magnet measured by the sensor can be measured in the form of a sine function or a cosine function, so trigonometric functions can be derived based on these results.

In FIGS. 6A and 6B, it is illustrated in that the measured result is approximated by a sine function, but is not limited thereto, and the measured result may be used as it is without approximation.

FIG. 7 is a drawing illustrating a case in which the magnitude of the magnetic force detected by a sensor is changed due to an external influence.

In general, when measuring the magnitude of a magnetic force emitted from a magnet using one sensor, there is a disadvantage of measuring the result including externally influenced noise.

In the case when the external environment changes, for example, when a physical impact is applied to the camera module, the temperature of the camera module increases or decreases abnormally, signal interference occurs due to other devices located near the magnet, or the like, the magnitude of the magnetic force generated in the magnet may be measured with different results as illustrated in FIG. 7.

That is, if there is no external influence so that noise is not included, the magnitude and direction of the magnetic force should be measured in the form of the graph ① of FIG. 7, but when noise occurs due to the presence of external influences, the magnitude and direction of the magnetic force measured by the sensor is measured in the form of the graph ②.

Accordingly, when the position of the lens is detected based on this, the magnitude of the magnetic force including the result of noise caused by the external environment is detected, so there is a problem in that detecting the position of the lens based on this is inferior in terms of accuracy.

Accordingly, a camera module 100 and a control method of the camera module according to an embodiment are an invention devised to solve this problem, and an object of the present invention is to provide a camera module and a control method of the camera module capable of more accurately detecting a position of a lens by acquiring information on a magnetic force from which external influence is removed using a plurality of sensors.

More specifically, an object is to provide a camera module 100 and a control method of the camera module capable of more accurately detecting a position of a lens by generating trigonometric functions based on the measured results using a plurality of sensors, obtaining result in which noise including external influence is removed by using the generated trigonometric functions. It will be studied in detail through the drawings below.

Figure 8A:
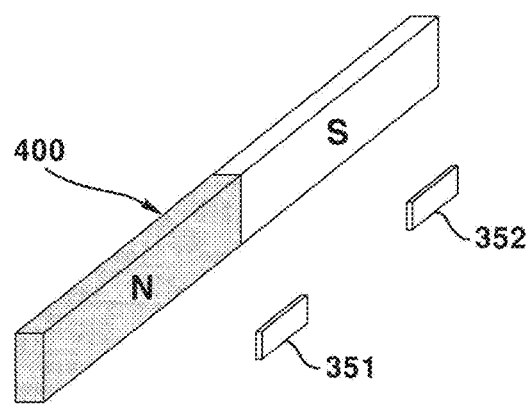
FIGS. 8A and 8B are drawings illustrating a result of sensing using a plurality of sensors for measuring the magnitude of magnetic force emitted from a magnet as a graph according to an embodiment.
Figure 8B:
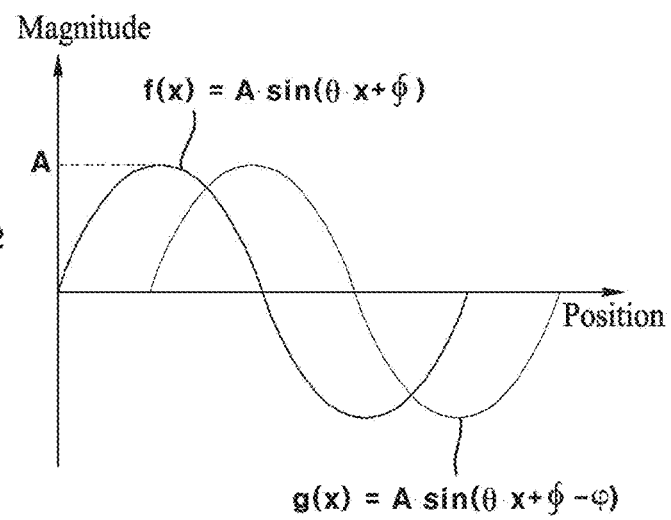

FIGS. 8A and 8B are drawings illustrating a result of sensing using a plurality of sensors for measuring the magnitude of magnetic force emitted from a magnet as a graph according to an embodiment.

The camera module 100 according to an embodiment may include a plurality of sensors 350 capable of measuring the magnitude of the magnetic field emitted from the magnet 400.

As an example, as illustrated in FIGS. 8A and 8B, two sensors, a first sensor 351 and a second sensor 352 may be provided, but are not limited thereto, and more sensors may be disposed in various positions depending on the purpose of use and the environment of use.

As illustrated in FIG. 8A, when there are two sensors that can measure the magnitude and direction of the magnetic field emitted from the magnet 400, as illustrated in FIG. 8B, two graphs measured by each of the sensors 351 and 352 may also be measured in different forms.

The two graphs illustrated in FIG. 8B express a graph calculated based on the result measured by the first sensor 351 as an f(x) function for convenience, and express a graph calculated based on the result measured by the second sensor 352 as a g(x) function. The unknown numbers expressed in each function can be derived through actual measurement results.

In the case of the functions f(x) and g(x) illustrated in FIGS. 8A and 8B, they are the function expressions according to the result of detecting the magnitude of the magnetic force including noise influenced externally, and if A of f(x) and g(x) is an external disturbance, f(x) and g(x) can be expressed by the following equations ① and ②. Here, x may mean a location or a distance.

$$f(x)=A*\sin(\theta*x+\phi) \qquad (1)$$

$$g(x)=A*\sin(\theta*x+\phi-\varphi)=A*\cos(\theta*x+\omega) \qquad (2)$$

If function expressions such as Equations ① and ② are calculated, f(x) is expressed as a sine function and g(x) is expressed as a cosine function, and, as in Equation ③, if f(x) is placed as a numerator and g(x) is placed as a denominator, a tangent (tan) function expression can be obtained as shown in Equation ③ below.

$$f(x)/g(x) = A*\sin(\theta*x+\phi)/A*\cos(\theta*x+\omega) \qquad (3)$$
$$= \tan(\theta*x+\alpha)$$

After that, by converting the tangent function of Equation ③ into an inverse function, an arc tangent (arctan) function expression can be obtained as shown in Equation ④ below, so information about the position x can be obtained accordingly.

$$\arctan(f(x)/g(x))=\theta*x+\alpha \qquad (4)$$

Therefore, since the final result obtained according to Equation ④ is the result calculated based on the measured value after removing the noise A due to the external environment, there is an effect of more accurately detecting the position of the lens than measuring the position of the lens using one sensor.

Figure 9:
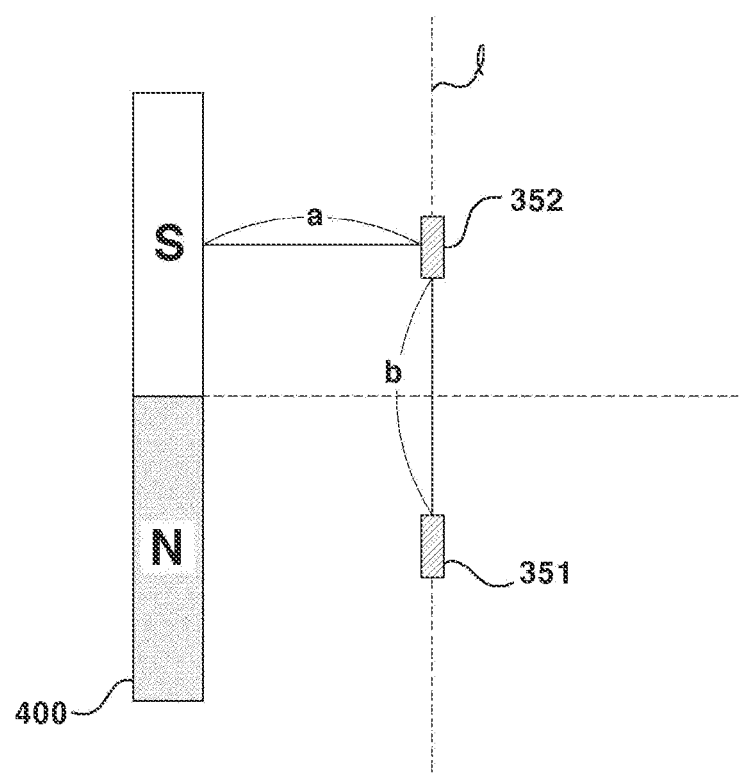
FIG. 9 is a diagram illustrating positions in which a plurality of sensors may be disposed according to an embodiment.

FIG. 9 is a diagram illustrating positions in which a plurality of sensors may be disposed, according to an embodiment. In FIG. 9, the two sensors 351 and 352 have been described as a reference, but are not limited thereto, and the sensors 350 may be disposed in various positions in various numbers according to the purpose of use and the environment of use.

The first sensor 351 and the second sensor 352 may be disposed at positions symmetrical to each other with respect to the center line of the magnet 400, or may be disposed on an axis l line parallel to the magnet 400.

Although the magnet 400 moves together due to the movement of the lens assembly, it can detect the magnitude and direction of magnetic force more accurately than the case in which, before moving, the sensors 351 and 352 are disposed at symmetrical positions with respect to the center line of the magnet 400 or the sensors 350 are disposed on the axis l line parallel to the magnet 400.

In addition, as described previously, if the position of the sensor 350 is too far from or too close to the magnet 400, there is a disadvantage in that the position of the lens cannot be accurately detected, so the first sensor 351 and the second sensor 352 may be disposed to be spaced apart from the magnet 400 by a preset first distance a.

Accordingly, the first sensor 351 and the second sensor 352 must be disposed spaced apart from the magnet 400 by a distance that can efficiently and accurately measure the position of the lens, preferably the first distance may include a distance of 0.5 mm or more and 2 mm or less.

When the first distance is 0.5 mm or less, the magnitude of the measured magnetic force is very strong, and when the distance is more than 2 mm, the magnitude of the measured magnetic force is weak, so there is a disadvantage that the position of the lens cannot be accurately detected, therefore the first sensor 351 and the second sensor 352 according to an embodiment may be disposed such that their distance from the magnet 400 is 0.5 mm or more and 2 mm or less.

In addition, the first sensor 351 and the second sensor 352 may be disposed to be spaced apart from each other by a preset second distance. Specifically, the preset second distance may include a distance of 1 mm or more and 2 mm or less.

When the second distance is 1 mm or less, the measured results are similar because the positions of the two sensors are close, or when the distance is 2 mm or more, the measured results are very different because the positions of the two sensors are too far apart, therefore there is a problem in that it is difficult to derive an accurate value using a function expression. Accordingly, the distance between the two sensors 351 and 352 may be arranged to be 1 mm to 2 mm or less for accurate measurement.

Figure 10:
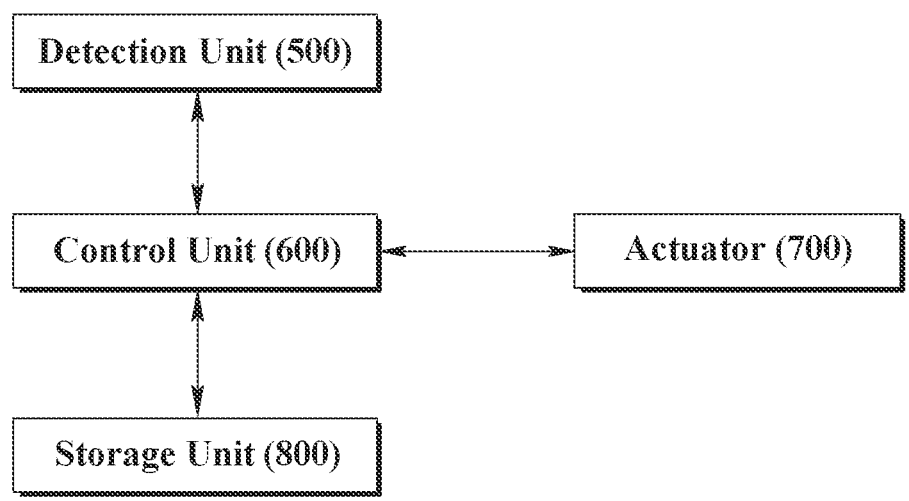
FIG. 10 is a block diagram illustrating some components of a camera module according to an embodiment.

FIG. 10 is a block diagram illustrating some components of a camera module 100 according to an embodiment.

Referring to FIG. 10, the camera module 100 according to an embodiment may comprise: a detection unit 500 for detecting the position of the lens; a control unit 600 for detecting the position of the lens based on the detection result by the detection unit 500 or operating the actuator 700; a storage unit 800 in which various information regarding the camera module 100 is stored; and the like.

The detection unit 500 may include a sensor 350 for detecting the magnet 400 described previously in the drawing, and the sensor 350 may include a Hall sensor, a gyro sensor, and the like. The detection unit 500 may transmit a result measured by the sensor to the control unit 600.

The position of the lens may be detected based on the result received through the control unit 600 and the detection unit 500. Specifically, the control unit 600 may respectively generate trigonometric functions including information on the magnitude of magnetic force according to position based on the information measured by a plurality of sensors, and detect the position of at least one lens based on the generated multiple trigonometric functions.

In addition, the control unit 600 generates a sine (sin) function expression or a cosine (cos) function expression including information on the magnitude of a magnetic force according to a position based on information measured by a plurality of sensors, and after generating a tangent (tan) function expression or an arctangent (arctan) function expression using the generated sine function expression and cosine function expression, may detect the position of the at least one lens based on the generated function expression. A method of detecting the position of the lens using the function expressions has been described in detail through FIGS. 8A and 8B so it will be omitted hereinafter.

In addition, the control unit 500 may control various devices provided in the camera module 600 including the actuator 700. Specifically, the control unit 500 may control the direction, magnitude, and amplitude of a current applied to a coil capable of moving a lens. The control unit 500 may perform AF driving, OIS driving, AF feedback control, and/or OIS feedback control of the camera module.

The storage unit 800 may store information on various devices provided in the camera module 100 including the lens and the actuator 700, and the control unit 600 may control various devices of the camera module 100 based on the information stored in the storage 800 and the results detected by the detection unit 500.

Accordingly, the storage unit 800 may be implemented as at least one of a nonvolatile memory devices such as a cache, a read only memory (ROM), a programmable ROM (PROM), an erasable programmable ROM (EPROM), an electrically erasable programmable ROM (EEPROM), and a flash memory, or a volatile memory device such as a random access memory (RAM), or a storage medium such as a hard disk drive (HDD) and a CD-ROM, but is not limited thereto.

In addition, the storage unit 800 may be a memory implemented as a separate chip in relation to the aforementioned control unit 600, or may be implemented as a single chip with the control unit 600.

Figure 11:
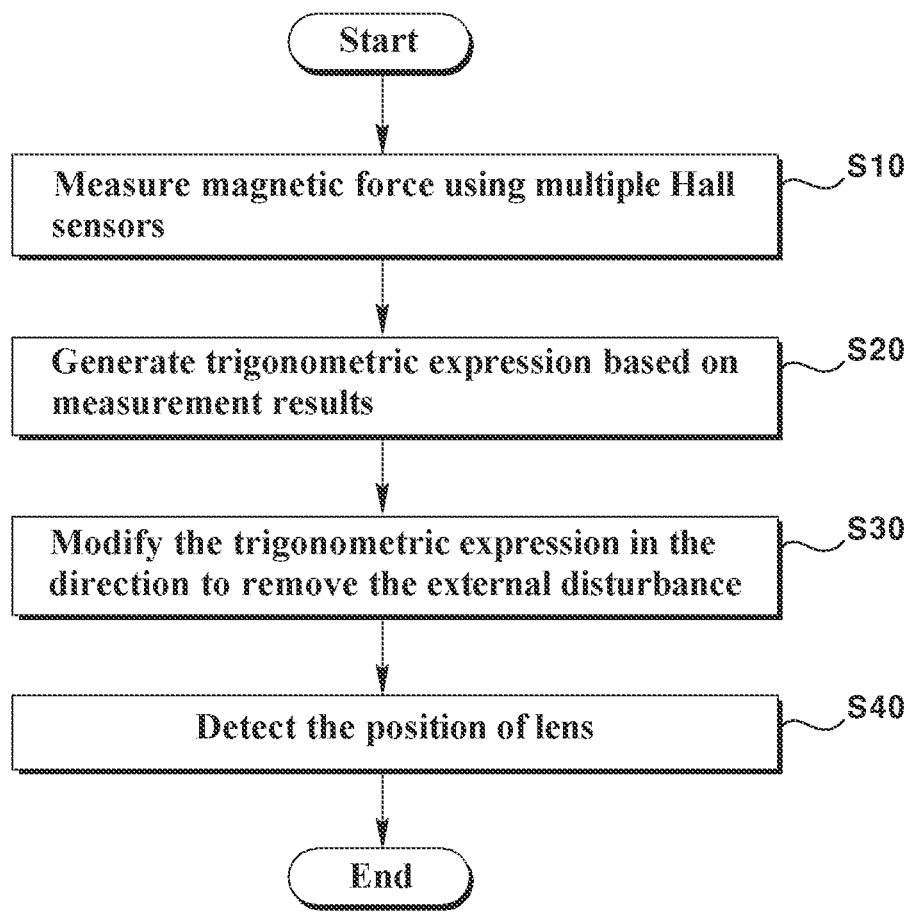
FIG. 11 is a sequential diagram illustrating a sequence according to a control method of a camera module according to an embodiment.

FIG. 11 is a sequential diagram illustrating a sequence according to a control method of a camera module 100 according to an embodiment.

Referring to FIG. 11, the camera module 100 may detect the direction and magnitude of a magnetic force emitted from a magnet 400 attached to a lens or a lens assembly using a plurality of sensors. (S10)

After that, a function expression including information on the magnitude of the magnetic force with respect to the position is generated based on the detection result from the plurality of sensors 350, and then the trigonometric functions can be converted in the direction of removing the external disturbance. (S20, S30)

Specifically, a sine (sin) function expression or a cosine (cos) function expression including information on the magnitude of a magnetic force according to a position is generated based on the information measured by the plurality of sensors 500, and a measurement value in which the effect of external disturbance is removed can be calculated in a way that a tangent (tan) function expression or an arctangent (arctan) function expression is calculated by using the generated sine function expression and cosine function expression.

Thereafter, the current position of the lens may be detected based on the calculated value and the measured value. (S40)

Up to now, various embodiments of the camera module 100 and a method of controlling the camera module 100 have been studied through the drawings.

A camera module according to the prior art, since one sensor was provided per magnet to detect the magnitude and direction of magnetic force emitted by a magnet attached to the lens barrel or lens assembly, the magnitude and direction of the magnetic force measured by the sensor were measured results including the noise influenced externally. Accordingly, there was a problem in that the position of the lens detected based on this does not coincide with the position of the actual lens.

However, a camera module 100 and a control method of a camera module 100 according to an embodiment can more accurately detect the position of the lens by obtaining information on the magnetic force from which the external influence is removed by using a plurality of sensors. More specifically, the position of the lens can be more accurately by respectively generating detected trigonometric functions based on the measured results, and obtaining result in which noise including external influence is removed using the generated trigonometric functions. Accordingly, there is an effect in that OIS correction can be performed more accurately than in the prior art.

In addition, in the case of present invention, since it can be implemented by additionally attaching only a sensor without additionally attaching an expensive device, so that a camera module that can accurately detect the position of the lens can be produced more economically.

Although the embodiments so far have been described with reference to the limited embodiments and drawings, various modifications and variations are possible from the above description by those skilled in the art. For example, appropriate results can be achieved if the described techniques are performed in a different order from the described method, and/or components of the described systems, structures, devices, circuits, and the like are combined or combined in a manner different from the described method, or even if substituted or substituted by other components or equivalents. Therefore, other embodiments and equivalents to the claims also fall within the scope of the claims to be described later.

The invention claimed is:

1. A camera module comprising:
a lens barrel comprising at least one lens and configured to move in an optical axis direction;
a magnet disposed on one surface of the lens barrel;
a first sensor and a second sensor configured to measure magnetic force emitted from the magnet; and
a control unit configured to detect a position of the lens by removing noise caused by an external environment based on information on the magnetic force measured by the first sensor and the second sensor,
wherein the first sensor and the second sensor are spaced apart from each other in the optical axis direction, and
wherein at least one of the first sensor and the second sensor is overlapped with the magnet in a first direction perpendicular to the optical axis direction.

2. The camera module according to claim 1, wherein the control unit detects the position of the lens based on a value of a numerical value comprising information on the magnetic force measured by the first sensor being offset with a numerical value comprising information on the magnetic force measured by the second sensor.

3. The camera module according to claim 1, wherein the control unit respectively generates trigonometric functions that comprise information on the magnitude of magnetic force according to position based on the information about the magnetic force measured by the first sensor and the second sensor, and detects the position of the lens based on the generated multiple trigonometric functions.

4. The camera module according to claim 1, wherein the control unit generates a sine (sin) function or a cosine (cos) function by a method of approximation of a numerical value comprising information on the magnetic force measured by the first sensor and the second sensor.

5. The camera module according to claim 4, wherein the control unit generates a tangent (tan) function or an arctangent (arctan) function by using the sine (sin) function and the cosine (cos) function, and then detects the position of the lens based on the generated function.

6. The camera module according to claim 4, wherein the control unit generates a sine (sin) function comprising the magnitude of the magnetic force according to the position based on the information measured by the first sensor, and generates a cosine (cos) function comprising the magnitude of the magnetic force according to the position based on the information measured by the second sensor.

7. The camera module according to claim 1, wherein the first sensor and the second sensor are disposed on the same axis line.

8. The camera module according to claim 1, wherein the first sensor and the second sensor are disposed at positions symmetrical to each other with respect to a center line of the magnet.

9. The camera module according to claim 1, wherein the first sensor and the second sensor are disposed equally spaced apart from each other by a preset first distance with respect to the magnet.

10. A control method of a camera module detecting a position of at least one lens comprising the steps of:
measuring a magnitude of a magnetic force emitted from a magnet disposed on one surface of the lens by using a first sensor and a second sensor; and
detecting a position of the lens by removing noise caused by an external environment based on information on magnetic force measured by the first sensor and the second sensor,
wherein the lens moves in an optical axis direction,
wherein the first sensor and the second sensor are spaced apart from each other in the optical axis direction, and
wherein at least one of the first sensor and the second sensor is overlapped with the magnet in a first direction perpendicular to the optical axis direction.

11. A camera module comprising:
a first lens and a second lens;
a first barrel and a second barrel respectively coupled to one surface of the first lens and the second lens;
a first magnet and a second magnet respectively coupled to one surface of the first barrel and second barrel;
a plurality of Hall sensors configured to respectively measure a plurality of magnetic forces emitted from the first magnet and the second magnet; and
a control unit configured to respectively generate trigonometric functions comprising information on a magnitude of magnetic force according to position based on information measured by the plurality of sensors and detect positions of the first lens and second lens based on the generated multiple trigonometric functions.

12. The camera module according to claim 11, wherein the plurality of Hall sensors comprise a first sensor and a second sensor configured to measure the magnetic force emitted from the first magnet, and a third sensor and a fourth sensor configured to measure the magnetic force emitted from the second magnet.

13. The camera module according to claim 11, wherein the control unit generates a sine (sin) function or a cosine (cos) function comprising information on the magnetic force measured by the sensor.

14. The camera module according to claim 13, wherein the control unit generates a tangent (tan) function or an arctangent (arctan) function by using the sine (sin) function and the cosine (cos) function, and then detects the position of the lens based on the generated function.

15. The control method of a camera module according to claim 10, wherein the step of detecting the position of the lens comprises a step of detecting the position of the lens based on a value of a numerical value comprising information on the magnetic force measured by the first sensor being offset with a numerical value comprising information on the magnetic force measured by the second sensor.

16. The control method of a camera module according to claim 10, wherein the step of detecting the position of the lens comprises a step of respectively generating trigonometric functions that comprise information on the magnitude of magnetic force according to position based on the information measured by the first sensor and the second sensor, and detecting the positions of the first lens and second lens based on the generated multiple trigonometric functions.

17. The control method of a camera module according to claim 10, wherein the step of generating the trigonometric functions comprises a step of generating a sine (sin) function or a cosine (cos) function that comprises information on the magnitude of a magnetic force according to a position based on the information measured by the first sensor and the second sensor.

18. The control method of a camera module according to claim 17, wherein the step of generating the trigonometric functions comprises a step of generating a tangent (tan) function or an arctangent (arctan) function by using the sine (sin) function and the cosine (cos) function, and then detecting the position of the lens based on the generated function.

19. The control method of a camera module according to claim 10, wherein the first sensor and the second sensor are disposed equally spaced apart from each other by a preset first distance with respect to the magnet.

20. The control method of a camera module according to claim 10, wherein the first sensor and the second sensor are disposed on a same axis line or disposed at positions symmetrical to each other with respect to a center line of the magnet.

\* \* \* \* \*